(12) United States Patent
Sakamoto et al.

(10) Patent No.: US 9,762,108 B2
(45) Date of Patent: Sep. 12, 2017

(54) METHOD FOR WINDING EDGEWISE COIL AND WINDING DEVICE

(71) Applicants: Tatsuya Sakamoto, Kasugai (JP); Yasuyuki Kawanishi, Fukushima (JP)

(72) Inventors: Tatsuya Sakamoto, Kasugai (JP); Yasuyuki Kawanishi, Fukushima (JP)

(73) Assignees: TOYOTA JIDOSHA KABUSHIKI KAISHA, Toyota-Shi (JP); NITTOKU ENGINEERING CO., LTD., Saitama-shi (JP)

( * ) Notice: Subject to any disclaimer, the term of this patent is extended or adjusted under 35 U.S.C. 154(b) by 177 days.

(21) Appl. No.: 14/402,170

(22) PCT Filed: Apr. 10, 2013

(86) PCT No.: PCT/JP2013/060818
§ 371 (c)(1),
(2) Date: Nov. 19, 2014

(87) PCT Pub. No.: WO2013/175885
PCT Pub. Date: Nov. 28, 2013

(65) Prior Publication Data
US 2015/0270763 A1    Sep. 24, 2015

(30) Foreign Application Priority Data
May 23, 2012    (JP) ................................ 2012-117689

(51) Int. Cl.
*H01F 7/06*    (2006.01)
*H02K 15/04*    (2006.01)
*H01F 41/061*    (2016.01)

(52) U.S. Cl.
CPC ......... *H02K 15/045* (2013.01); *H01F 41/061* (2016.01); *Y10T 29/49071* (2015.01)

(58) Field of Classification Search
CPC . H02K 15/045; H01F 41/0612; H01F 41/061; Y10T 29/49071; Y10T 29/4902; Y10T 29/49002
(Continued)

(56) References Cited

U.S. PATENT DOCUMENTS

2007/0079642 A1* 4/2007 Bibeau .................. B21D 11/06
                                                                72/307
2010/0180977 A1   7/2010 Sugishima
2012/0086298 A1   4/2012 Fubuki et al.

FOREIGN PATENT DOCUMENTS

JP    2001086711 A  *  3/2001
JP    2002-198245 A     7/2002
(Continued)

*Primary Examiner* — Peter DungBa Vo
*Assistant Examiner* — Azm Parvez
(74) *Attorney, Agent, or Firm* — Andrews Kurth Kenyon LLP

(57) ABSTRACT

Provided is a method for winding an edgewise coil and a winding device capable of saving time and labor when changing a guide. A guide bar is disposed in contact with the side face of the rectangular conductor bent by the bending jig and the rotation center of the guide bar deviates from the rotation center of a bending jig for bending a rectangular conductor. The guide bar rotates in accordance with the action whereby the bending jig bends the rectangular conductor and supports the outside surface of a coil on the side of rotational direction of the bending jig.

5 Claims, 14 Drawing Sheets

(58) Field of Classification Search
USPC .......................... 29/605, 602.1, 592.1; 72/66
See application file for complete search history.

(56) References Cited

FOREIGN PATENT DOCUMENTS

| | | |
|---|---|---|
| JP | 2006-288025 A | 10/2006 |
| JP | 2007-074881 A | 3/2007 |
| JP | 2009135222 A | 6/2009 |
| JP | 2009-302245 A | 12/2009 |
| JP | 2011-061099 A | 3/2011 |
| JP | 4831644 B1 | 12/2011 |
| JP | 2013-106402 A | 5/2013 |
| WO | 2011001736 A1 | 1/2011 |

* cited by examiner

METHOD FOR WINDING EDGEWISE COIL AND WINDING DEVICE

CROSS-REFERENCE TO RELATED APPLICATIONS

This is a national phase application based on the PCT International Patent Application No. PCT/JP2013/060818 filed Apr. 10, 2013, claiming priority to Japanese Patent Application No. 2012-117689 filed May 23, 2012, the entire contents of both of which are incorporated herein by reference.

TECHNICAL FIELD

The present invention relates to a method for producing a coil to be used in a stator and others and more particularly to a technique for preventing deformation of the coil by supporting a rectangular conductor while the rectangular conductor is subjected to edgewise bending to form the coil.

BACKGROUND ART

In recent years, vehicles such as a hybrid car and an electric car, which use a motor for driving, have been developed increasingly. However, when a motor is used for driving, further downsizing and high power of a motor are demanded. Main conventional motors use coils each formed by winding a wire having a circular cross section. In response to demands for downsizing and high power to be used as driving of vehicles, the use of a coil formed of a rectangular wire having a rectangular cross section in a motor has been studied. This results in an advantage that the use of the rectangular wire is effective in enhancing a lamination factor of a stator and increasing high power.

Patent Document 1 discloses a technique of an edgewise coil winding method and a winding device. While a bent portion of a rectangular wire fed each by a preset length is held by a supporting member of a main clamp serving as a bending means and a bender, and a side of the continuous rectangular wire to be supplied is fixed to the bending means, the bender is rotated about the supporting member to bend the held rectangular wire, thus forming the edgewise coil. At that time, a coil guide is engaged with an inner circumference side of the edgewise coil to be formed, and the coil guide is moved to follow the movement of the edgewise coil by a feeding operation of the rectangular wire. Thus, the coil guide is rotated and moved according to the bending operation to follow the movement of the edgewise coil. In the above way, it is possible to suppress wobble and swing of a coil caused during coil winding.

RELATED ART DOCUMENTS

Patent Documents

Patent Document 1: JP-A-2009-302245

SUMMARY OF INVENTION

Problems to be Solved by the Invention

However, the following problems are conceived in forming a coil by use of the device disclosed in Patent Document 1.

If a configuration of holding the inner circumferential side of a coil during edgewise bending of the coil is adopted, it is necessary to change the shape of a guide for each coil and also tooling change. For winding the coil into a rectangular shape, a guide needs different movements to form a short side and a long side of a coil, resulting in the necessity of complicated operations. To be concrete, the guide has to be rotated and moved to depict an involute curve and follow the feeding of a rectangular conductor. Accordingly, two vertical axes and one rotation axis need to be independently controlled to operate the guide. There may be a need to tandem drive in order to increase the winding speed. This causes problems with cost increase of the device, troublesome tool changing, and others.

The present invention has been made to solve the above problems and has a purpose to provide a method for winding an edgewise coil and a winding device, capable of achieving relatively low cost and reduced troublesomeness for guide replacement.

Means of Solving the Problems

To achieve the above purpose, one aspect of the invention provides a method for winding an edgewise coil configured as below.

(1) In a method for edgewise winding a coil, including a bending operation using a bending unit to edgewise bend a rectangular conductor and a predetermined distance feeding operation using a feeding unit to feed the rectangular conductor by a predetermined distance, the bending operation and the predetermined distance feeding operation being repeated to form the coil, the bending unit rotates a guide having a rotation mechanism in accordance with the bending operation of the rectangular conductor by the bending unit, and the guide supports an outer side surface of the coil on a side in a rotation direction of the bending unit.

According to the above aspect described in (1), the guide having a rotation mechanism supports the outer side surface of the coil. This enables suppression of deformation of the coil caused by inertia acting when the coil is wound by the bending unit. This is because when the guide supports the side surface of the coil on the side in the rotation direction of the bending unit, collapse of the coil toward the rotation direction can be prevented, thereby enabling preventing plastic deformation of the coil edgewise bent. This guide realizes supporting of the coil only by the rotation mechanism. This enables reduction of a drive mechanism to be controlled, resulting in a cost reduction of the winding device.

Since a method for supporting the outer side surface of the coil is adopted, the same device can be used even if the shape of the coil to be produced is changed. Specifically, there is no need for tooling change as shown in Patent Document 1. With these effects, it is possible to provide a producing method whereby cost reduction of the coil can be realized.

(2) In the method for winding an edgewise coil described in (1), preferably, the guide includes a first guide and a second guide located diagonally opposite to each other with respect to a rotation center of the guide, the coil has corners referred to as a first corner, a second corner, a third corner, and a fourth corner in an order to be formed by edgewise bending, the first guide supports the outer side surface of the coil when the bending unit forms the first corner by edgewise bending and when the bending unit forms the second corner by edgewise bending, and the second guide supports the outer side surface of the coil when the bending unit forms the third corner by edgewise bending and when the bending unit forms the fourth corner by edgewise bending.

In the above configuration described in (2), two guides, i.e., the first guide and the second guide, are provided. This enables continuous guiding of the coil by use of the first guide and the second guide in turn to form bending portions of one turn, that is, four bending portions of the coil. For instance, the first guide is moved 90 degrees in forming the first corner by edgewise bending and is further moved 90 degrees in forming the second corner by edgewise bending. However, the bending unit repeats the bending operation of 90 degrees always in the same direction. If the first guide is displaced due to two edgewise bending operations, therefore, the first guide has to be moved about 180 degrees in forming a next third corner by edgewise bending. This requires a lead time.

In contrast, since the second guide is provided diagonally opposite to the first guide with respect to the rotation center, at a stage that the first guide is moved 180 degrees, the second guide is present at the same position as the first guide before moved. This enables continuing to guide the outer side surface of the coil without rotating and moving the guide. Accordingly, since the first guide and the second guide are provided and the second guide is place at a point-symmetric position to the first guide with respect to the rotation center. This can contribute to a lead time.

(3) In the method for winding an edgewise coil described in (2), preferably, the guide has the rotation center at a position deviated from a rotation center of the bending unit and includes a third guide and a fourth guide diagonally opposite to each other with respect to the rotation center of the guide, the coil is wound in a rectangular shape, the feeding unit performs a long-side feeding operation to form a long side portion of the rectangular shape and a short-side feeding operation to form a short side portion of the rectangular shape, the third guide or the fourth guide is placed in contact with the outer side surface of the coil before the rectangular conductor is moved by the short-side feeding operation by the feeding unit, and the third guide or the fourth guide is rotated in accordance with an operation of short-side feeding the rectangular conductor by the feeding unit to support the outer side surface of the coil on a side in an advancing direction of the feed unit.

In the above configuration described in (3), the third guide and the fourth guide support the outer side surfaces of the coil during the short-side feeding. Thus, even when the rectangular conductor is fed by a predetermined distance by the feeding unit, deformation in the short-side feeding can be suppressed. Since the rotation center of the bending unit and the rotation center of the guide are deviated, the interference between the guide and the coil can be prevented. Since the coil 30 is less likely to be deformed during the long-side feeding as compared with the short-side feeding, it is conceived that the deformation of the coil can be suppressed if only the coil is supported during the short-side feeding.

(4) In the method for winding an edgewise coil described in one of (1) to (3), preferably, the guide is provided with a support plate configured to support the coil, the support plate being placed to face a plane of the coil perpendicular to a winding center of the coil.

In the above configuration described in (4), the support plate is placed to face the plane of the coil perpendicular to the winding center, that is, the upper surface of the coil being increasing in layers by winding the rectangular conductor. In a case where the coil tends to incline, the support plate supports the upper surface of the coil. As a result, the deformation of the coil can be suppressed even when the rectangular conductor is subjected to edgewise bending using the bending unit or when the rectangular conductor is moved by the short-side feeding and the long-side feeding.

To achieve the above purpose, another aspect of the invention has the following characteristics.

(5) In a winding device configured to form a coil, the device including a bending unit configured to edgewise bend a rectangular conductor and a feeding unit configured to feed the rectangular conductor by a predetermined distance, the device includes a guide configured to contact with an outer side surface of the coil formed of the rectangular conductor bent by the bending unit to support the coil, and the guide is driven to rotate in accordance with an operation of the bending unit.

In the configuration described in (5), the guide for supporting the outer side surface of the coil is provided with the rotation mechanism configured to rotate the guide to support the coil making intricate movement. The guide enables suppressing deformation of the coil caused by inertia acting in winding the bending unit. The coil is swung at the leading end of the rectangular conductor when the rectangular conductor is edgewise bent by the action of the bending unit. Since the outer side surface of the coil is supported by the guide, the upper part of the coil can be suppressed from becoming swung due to inertia. This can suppress deformation of the coil.

This guide is operated by the rotation mechanism to follow the coil, so that the cost of the winding device can be reduced. Furthermore, since the guide that supports the outer side surface of the coil, the position of the guide is determined by controlling the rotation mechanism, there is no need for tool changing even when a different-shaped coil is to be formed. This contributes to cost reduction of the winding device.

(6) In the winding device described in (5), preferably, the guide includes a first guide and a second guide located diagonally opposite to each other with respect to a rotation center of the guide, the coil has corners referred to as a first corner, a second corner, a third corner, and a fourth corner in an order to be formed by edgewise bending, the first guide supports the outer side surface of the coil when the bending unit edgewise bends the rectangular conductor to form the first corner and the second corner, and the second guide supports the outer side surface of the coil when the bending unit edgewise bends the rectangular conductor to form the third corner and the fourth corner.

In the configuration described in (6), two guides, i.e., the first guide and the second guide are prepared, so that the coil can be guided continuously by use of the first guide and the second guide in turn when one turn of the coil, i.e., four bending portions are to be formed. Thus, for example, the position of the first guide is moved 90 degrees when the first corner is to be guide bar bent and is moved further 90 degrees when the second corner is to be guide bar bent. Since the second guide is provided diagonally opposite to the first guide, at the stage where the first guide is moved 180 degrees, the second guide is present at the same position as a position of the first guide before movement. The guide can continuously guide the outer side surface of the coil without rotating and moving the guide. Thus, the first guide and the second guide are provided so that the first guide and the second guide are placed in point-symmetrical positions with respect to the rotation center, which can contribute to the lead time.

(7) In the winding device described in (6), preferably, the guide has the rotation center at a position deviated from a rotation center of the bending unit and includes a third guide and a fourth guide located diagonally opposite to each other with respect to the rotation center of the guide, and the third guide or the fourth guide supports the outer side surface of the coil on a side in an advancing direction of the feeding unit during a short-side feeding operation in the predetermined distance feeding operation performed by the feeding unit to form a short side portion of the coil to be wound in a rectangular shape.

In the configuration described in (7), the third guide and the fourth guide support the outer surface of the coil during the short-side feeding. They can guide the coil even when the coil is fed by the feeding unit. This can suppress the deformation of the coil even during the short-side feeding of the rectangular conductor.

(8) In the winding device described in one of (5) to (7), preferably, the guide is provided with a support plate configured to support the coil, the support plate is placed to face a plane of the coil perpendicular to a winding center of the coil, and the support plate is provided with a moving mechanism configured to move the rectangular conductor of the coil in a laminating direction.

In the above configuration described in (8), the support plate presses the surface of the coil perpendicular to the winding center, that is, the upper surface of the coil being increased by winding of the rectangular conductor. The support plate is moved upward by the movement mechanism according to winding of the coil, thereby enabling appropriately holding the position of the support plate. As a result, the deformation of the coil can be suppressed even when the rectangular conductor is to be edgewise bent by the bending unit and even during the short-side feeding and the long-side feeding.

MODE FOR CARRYING OUT THE INVENTION

A detailed description of a first embodiment of the present invention will now be given referring to the accompanying drawings.

Figure 1:
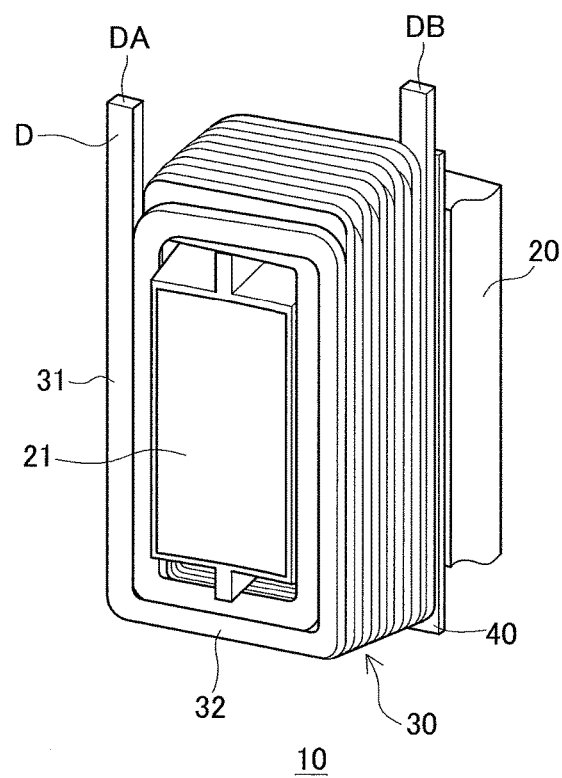
FIG. 1 is a perspective view of a stator in a first embodiment.
Figure 2:
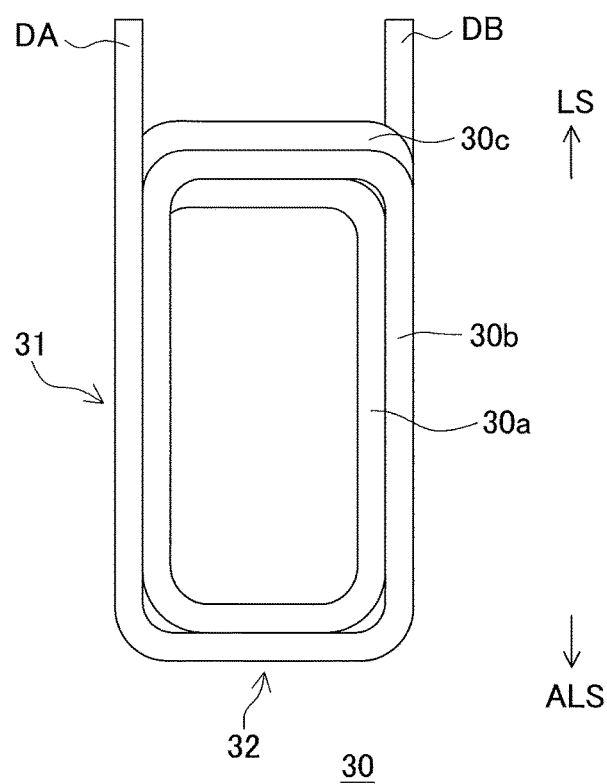
FIG. 2 is a front view of a coil in the first embodiment.

FIG. 1 is a partial perspective view of a stator 10. FIG. 2 is a front view of a coil 30. The stator 10 is formed in such a manner that the coil 30 is inserted on a teeth part 21 of a stator core 20. Further, an insulator 40 is provided to separate and insulate the stator core 20 and the coil 30.

The coil 30 is wound in an almost rectangular shape by edgewise bending a conductor D having a rectangular cross section ("rectangular conductor") as shown in FIG. 1. The coil 30 is wound by edgewise bending into a rectangular shape having short sides 32 and long sides 31 as shown in FIG. 2. On a lead side LS, a first lead terminal DA and a second lead terminal DB are arranged. On the long side 32 on the lead side LS, a third column 30c is arranged in addition to a first column 30a located in the innermost circumference of the coil 30 and a second column 30b located on the outer circumference of the first column 30a. On the other hand, both of the short side 32 and the long side 31 on a non-lead side ALS form a double layer structure including the first column 30a and the second column 30b.

Figure 3:
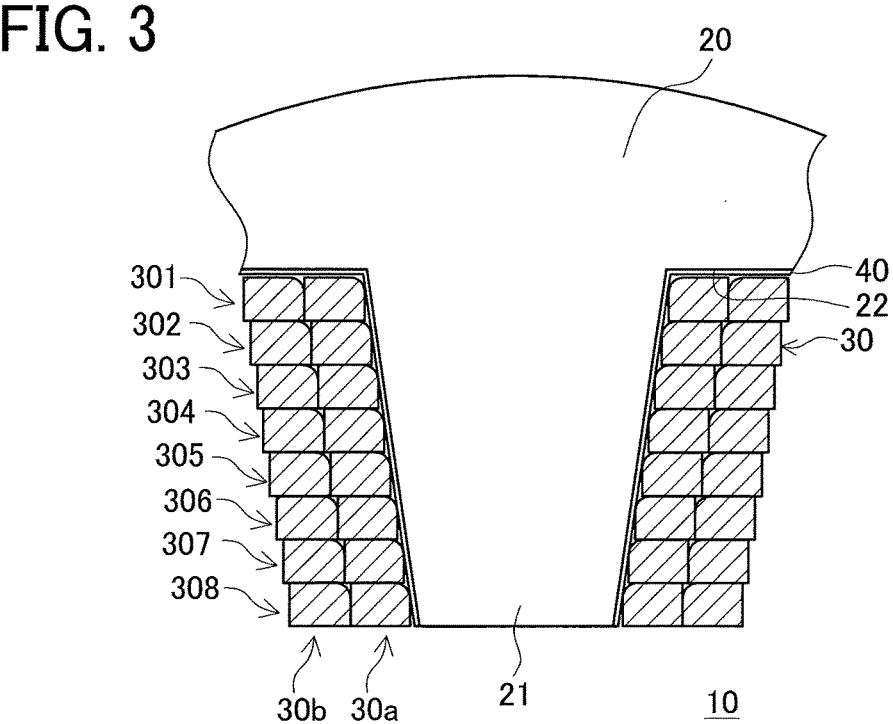
FIG. 3 is a cross sectional view of the stator in the first embodiment.

FIG. 3 is a partial cross sectional view of the stator 10. As shown in the partial cross section of the stator 10, the coil 30 is wound double on the teeth part 21 of the stator core 20. Ten turns of the rectangular conductor D are stacked in each slot 22 in a radial direction of the stator 10. For convenience, a turn of the rectangular conductor D located on the outermost circumferential side is referred to as a first layer 301, and subsequent turns of the rectangular conductor D located on an inner circumferential side are referred to as a second layer 302, a third layer 303, a fourth layer 304, a fifth layer 305, a sixth layer 306, a seventh layer 307, and an eighth layer 308. The coil 30 is wound in this way in eight layers and two columns It is to be noted that a three-column configuration is made only on the lead side LS as described above.

The stator core 20 is made of a plurality of stacked electromagnet steel plates having the same shape. The stator core 20 is provided with the teeth part 21 protruding on the inner circumferential side of the stator 10. The slots 22 are arranged on both sides of each teeth part 21. The insulator 40 includes a cylindrical portion covering the teeth part 21 and a plate-like portion that separates the slots 22 and the coil 30. This insulator 40 is made of high insulating resin. The insulator 40 ensures insulation between the coil 30 and the stator core 20.

The insulator 40 is provided on the teeth part 21 of the stator core 20 formed in a stack form. The coil 30 formed of the rectangular conductor D edgewise bent is placed on the teeth part 21. Thus, the stator 10 is formed. Although the stator core 20 used in the explanation is not particularly limited to a separate type or a one-piece type, the present invention is applicable to the separate type or the one-piece type.

Figure 4:
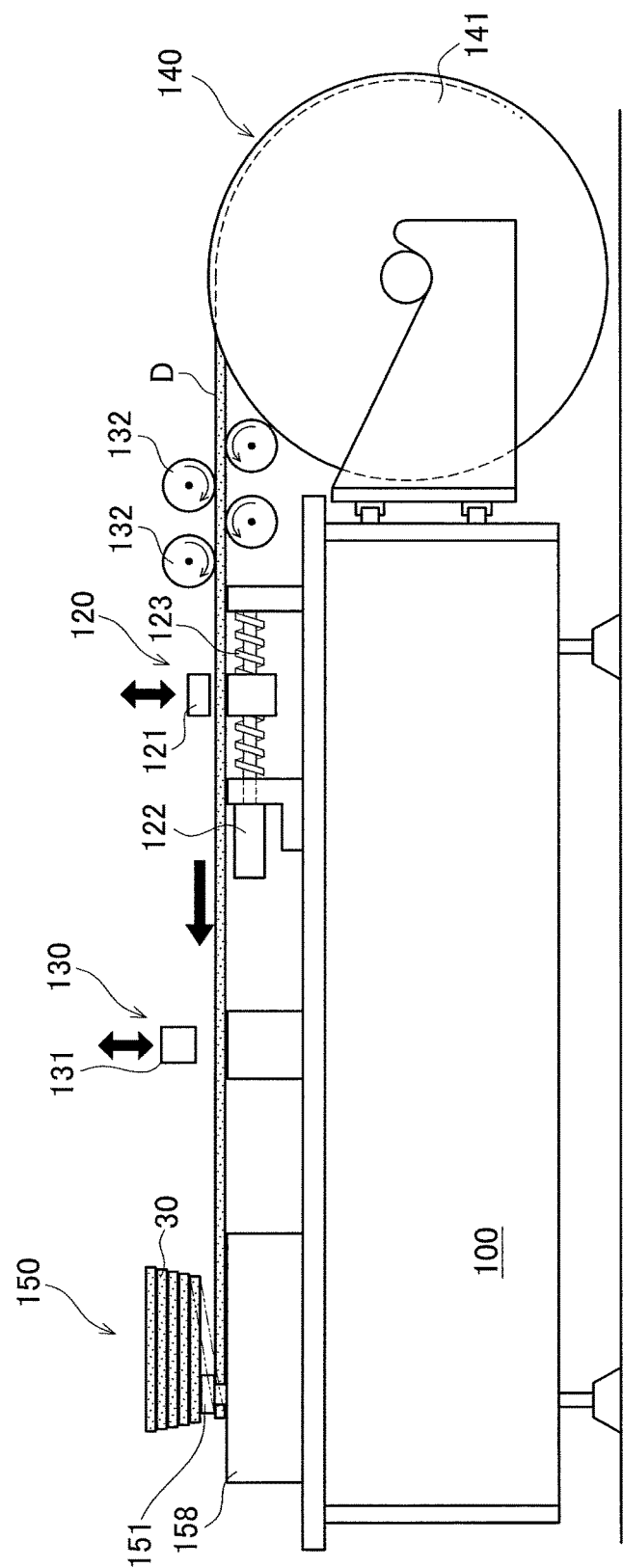
FIG. 4 is a schematic front view of a winding device in the first embodiment.
Figure 5:
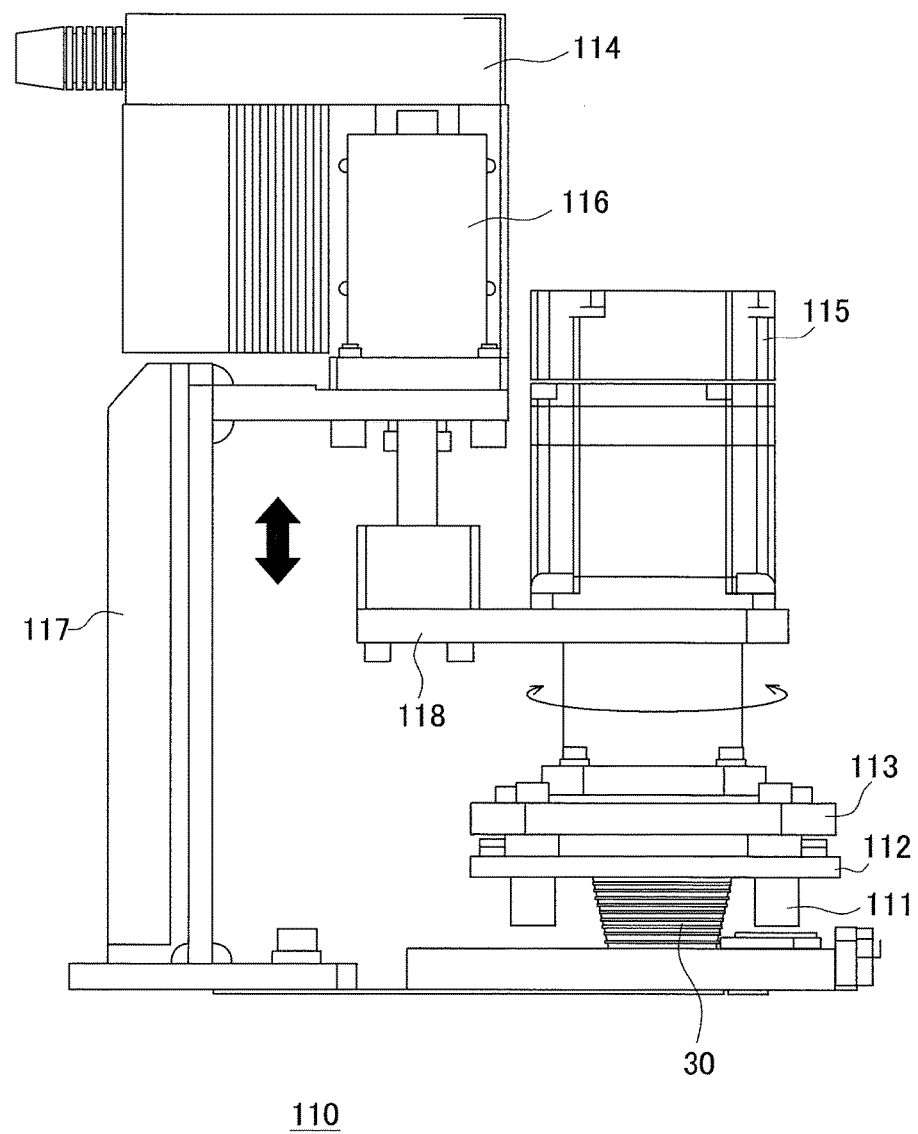
FIG. 5 is a schematic side view of a guide device in the first embodiment.

The winding device 100 for forming the coil 30 will be briefly explained below. FIG. 4 is a schematic front view of the winding device 100. FIG. 5 is a schematic side view of a guide device 110. The winding device 100 includes a feeding mechanism 120, a holding mechanism 130, a wind-off mechanism 140, and a wind-up mechanism 150. On a bobbin 141 provided in the wind-off mechanism 140, a rectangular conductor D is wound in a flatwise direction. A feed clamp 121 provided in the feeding mechanism 120 is moved by a ball screw 123 and a motor 122 to feed the rectangular conductor D being clamped by the feeding clamp 121 by a predetermined distance, thereby drawing the rectangular conductor D from the bobbin 141. The thus drawn rectangular conductor D is uncurled by a straightening roller 132 so as to move straight.

The holding mechanism 130 is a mechanism configured to clamp the rectangular conductor D by a holding clamp 131 and function to hold the rectangular conductor D against movement when the conductor D is unclamped from the feeding clamp 121. The wind-up mechanism 150 functions to edgewise bend the rectangular conductor D. While a center post 151 clamps the inner circumferential side of the rectangular conductor D, a bending jig 152 which will be explained in FIG. 6 mentioned later is rotated about the center post 151, thereby edgewise bending the rectangular conductor D. In FIG. 4, the outer appearance of the guide device 110 is omitted.

Figure 6:
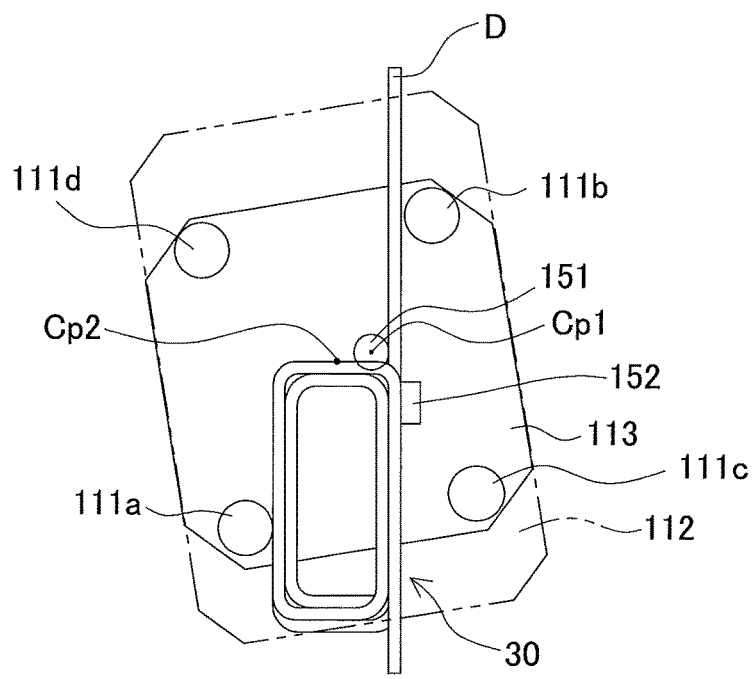
FIG. 6 is a schematic plan view showing a state of a guide bar during coil winding in the first embodiment.

FIG. 5 is a side view of the guide device 110, which is seen from the side corresponding to the side of the coil 30 in FIG. 4. The guide device 110 includes a motor 115 to rotate a guide bar 111 and a support plate 112 to prevent collapse of the coil 30. The motor 115, the guide bar 111, and the support plate 112 are coupled to one another through the base plate 113. The guide bars 111 include four, a first guide 111*a* to a fourth guide 111*d,* arranged evenly with respect to a rotation center Cp2 of the base plate 113 as shown in FIG. 6. Thus, the first guide 111*a* to the fourth guide 111*d* are arranged on a circle centered on the rotation center Cp2. Each guide bar 111 is a cylindrical guide and is supported on the base plate 113 rotatably in contact with an outer side surface of the coil 30.

An elevating motor 114 attached to an L-shaped bracket 117 is provided to move up and down the motor 115 fixed to a bracket 118. This bracket 118 is coupled to the L-shaped bracket 117 by two pairs of slide guides 116 which are provided in two positions corresponding to both sides of the elevating motor 114. The elevating motor 114 and the motor 115 are controlled to stop at an arbitrary position by a servo motor connected to a controller not shown.

Accordingly, the guide bars 111 and the support plate 112 are configured to rotate and move up/down by use of the elevating motor 114 and the motor 115. The guide bars 111 are rotated in response to movement of the bending jig 152 of the wind-up mechanism 150 to support the outer side surface of the coil 30. The support plate 112 is placed so as to touch the upper surface of the coil 30 to support the upper surface of the coil 30. When the coil 30 is to be wound and layered, the support plate 12 is moved by the elevating motor 114 to adjust to an appropriate height for the coil 30.

A winding step of winding the coil 30 using the winding device 100 will be explained referring to the drawings.

Figure 7:
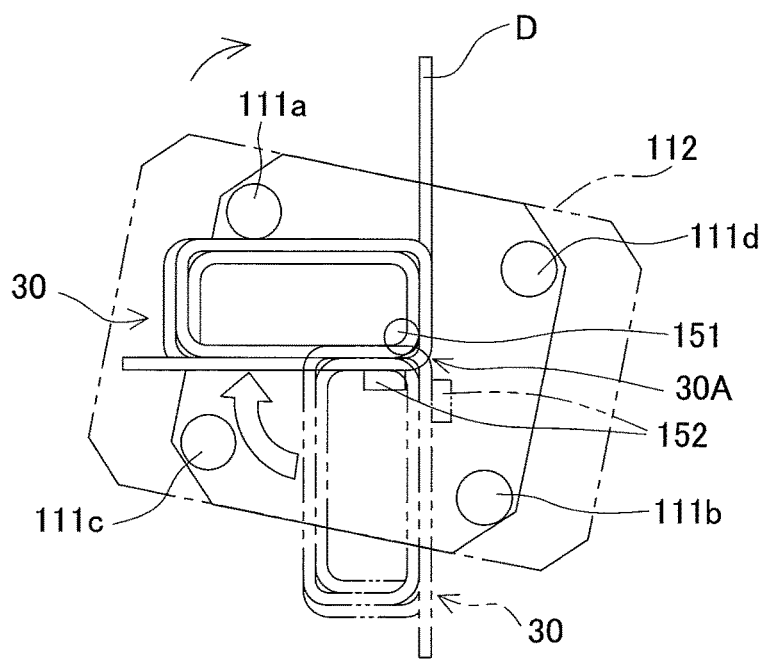
FIG. 7 is a schematic plan view showing a state that a first corner is formed by bending in the first embodiment.
Figure 8:
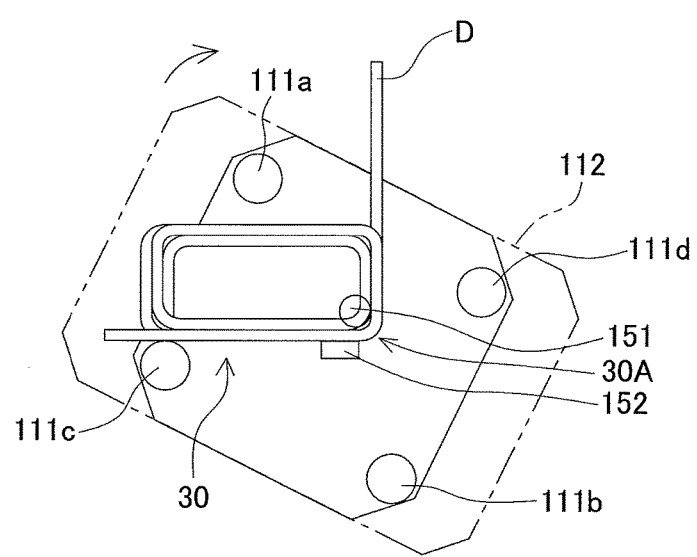
FIG. 8 is a schematic plan view showing a state that a third guide is moved in the first embodiment.
Figure 9:
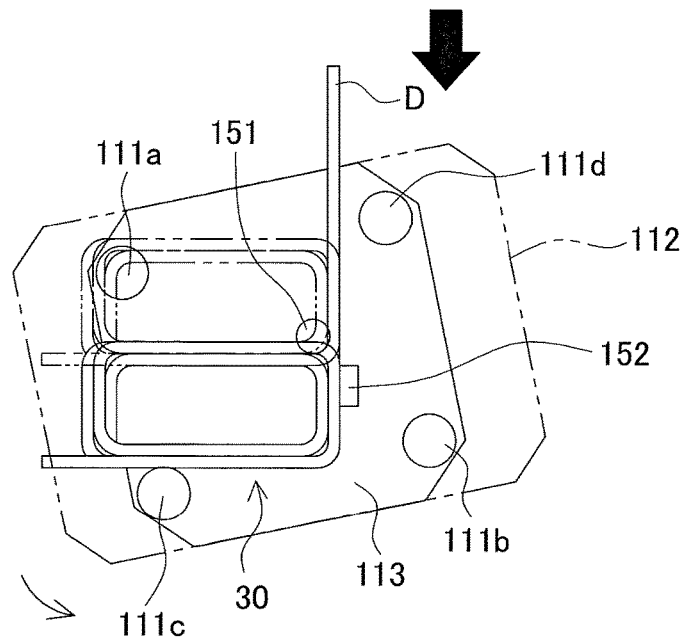
FIG. 9 is a schematic plan view showing a state that a rectangular conductor is moved by short-side feeding in the first embodiment.
Figure 10:
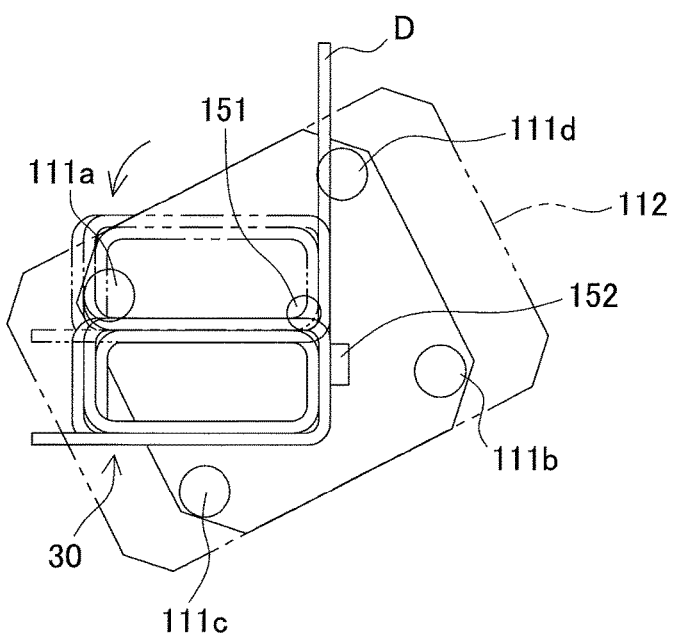
FIG. 10 is a schematic plan view showing a state that a first guide is moved in the first embodiment.
Figure 11:
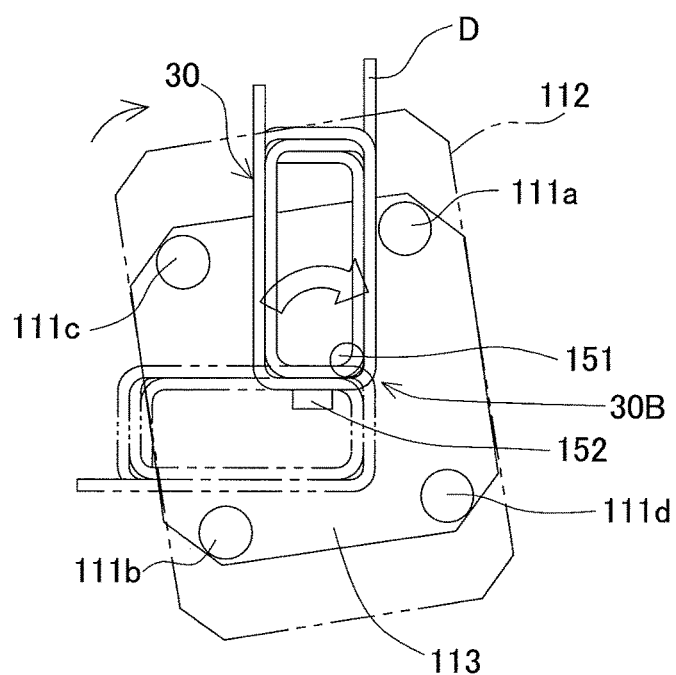
FIG. 11 is a schematic plan view showing a state that a second corner is formed by bending in the first embodiment.
Figure 12:
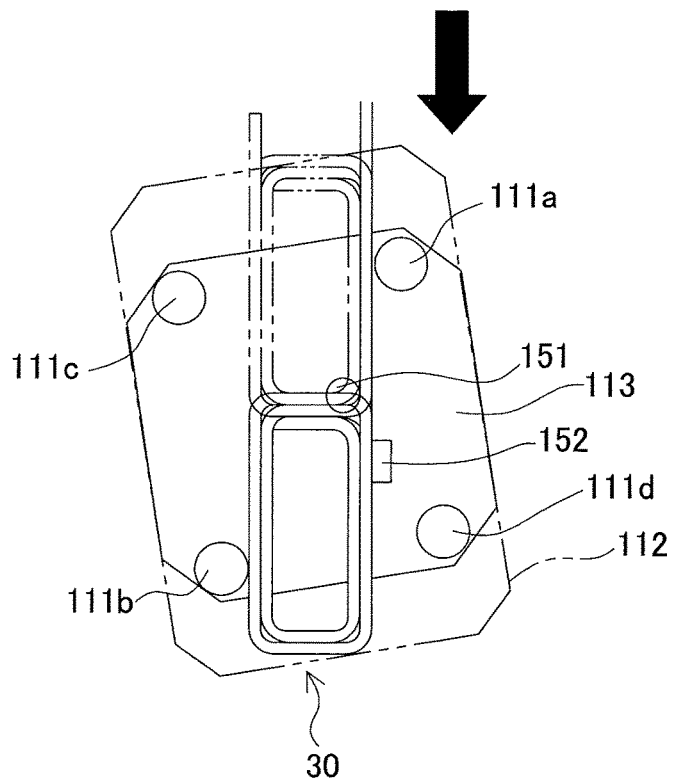
FIG. 12 is a schematic plan view showing a state that the rectangular conductor is moved by long-side feeding in the first embodiment.
Figure 13:
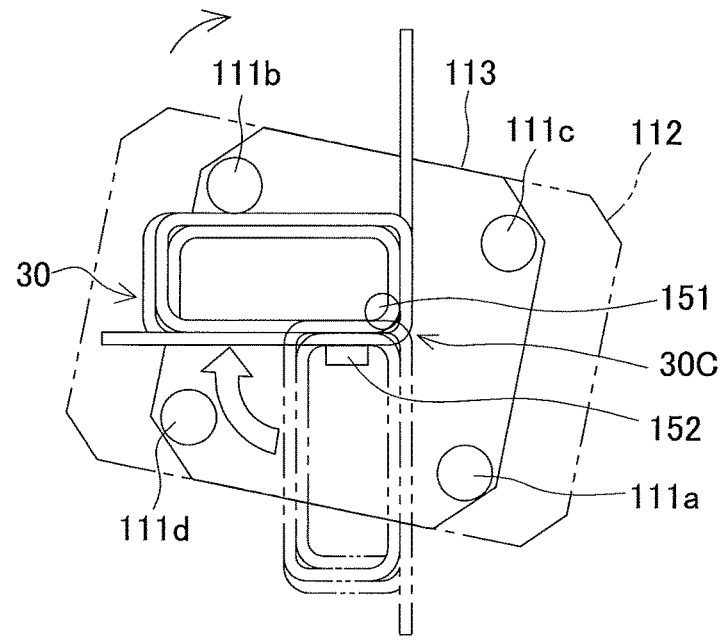
FIG. 13 is a schematic plan view showing a state that a third corner is formed by bending in the first embodiment.
Figure 14:
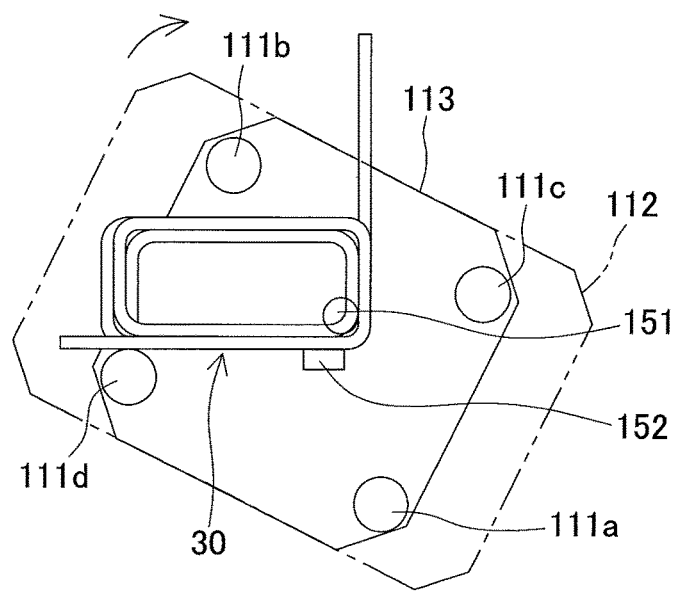
FIG. 14 is a schematic plan view showing a state that a fourth guide is moved in the first embodiment.
Figure 15:
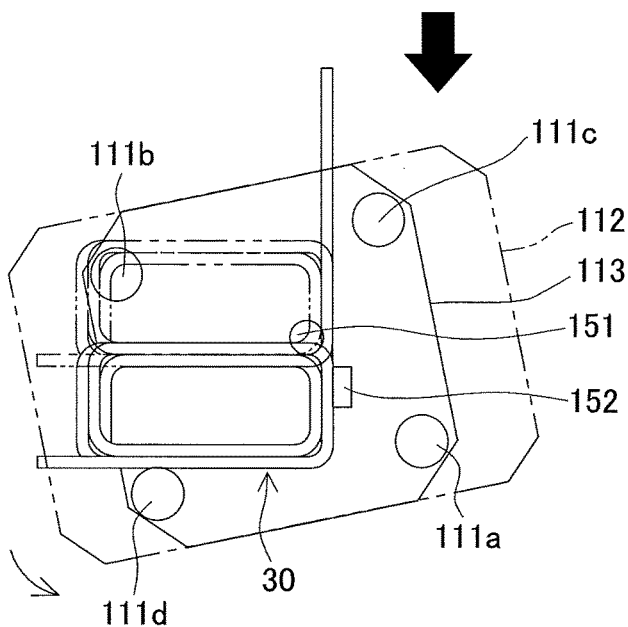
FIG. 15 is a schematic plan view showing a state that the rectangular conductor is moved by short-side feeding in the first embodiment.
Figure 16:
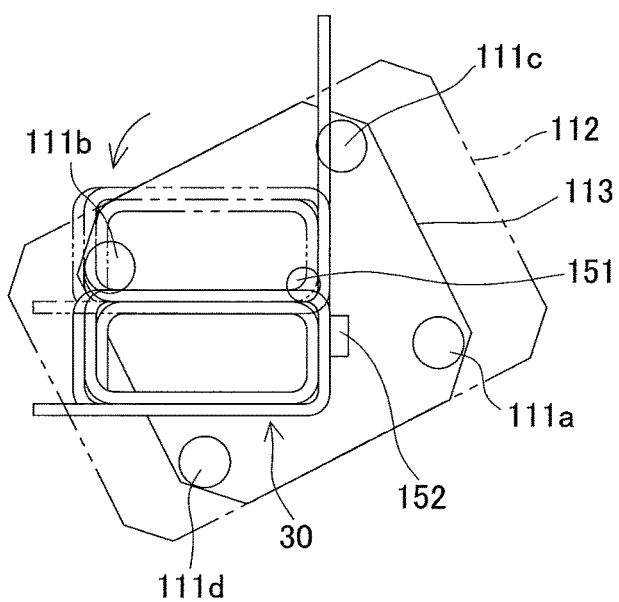
FIG. 16 is a schematic plan view showing a state that a second guide is moved in the first embodiment.
Figure 17:
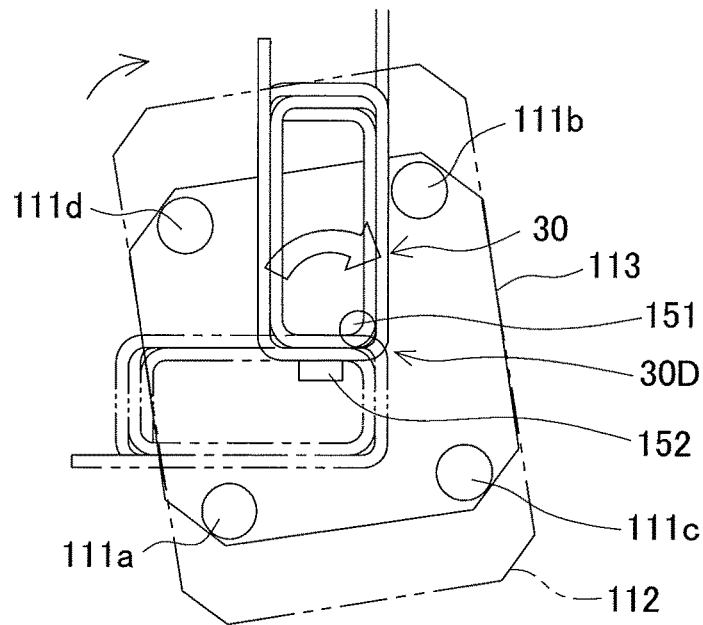
FIG. 17 is a schematic plan view showing a state that a fourth corner is formed by bending in the first embodiment.
Figure 18:
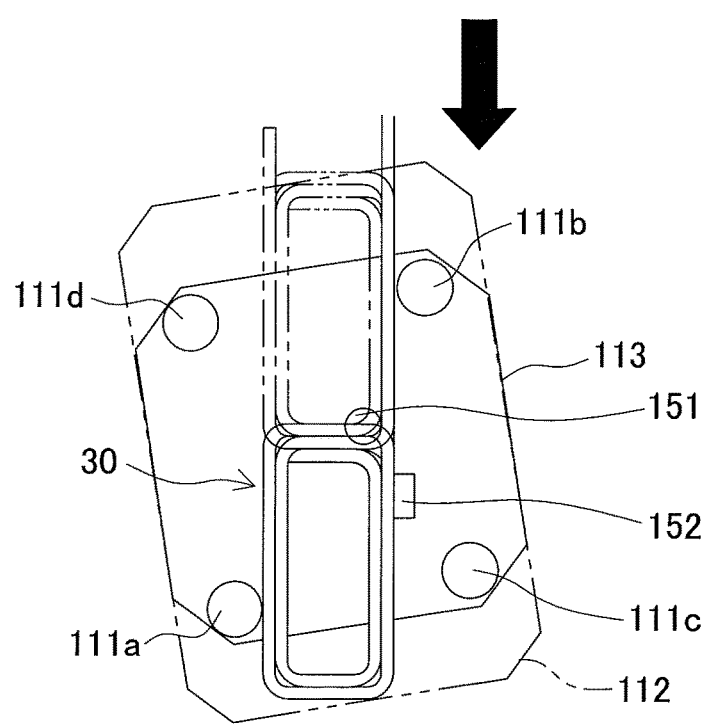
FIG. 18 is a schematic plan view showing a state that the rectangular conductor is moved by long-side feeding in the first embodiment.

FIG. 6 is a schematic plan view showing a state of the guide bars 111 during coil winding. FIG. 7 is a schematic plan view showing a state that a first corner 30A is formed by bending. FIG. 8 is a schematic plan view showing a state that the third guide 111*c* is moved. FIG. 9 is a schematic plan view showing a state that the rectangular conductor D is moved by a short-side feeding operation. FIG. 10 is a schematic plan view showing a state that the first guide 111*a* is moved. FIG. 11 is a schematic plan view showing a state that a second corner 30B is formed by bending. FIG. 12 is a schematic plan view showing a state that the rectangular conductor D is moved by a long-side feeding operation. FIG. 13 is a schematic plan view showing a state that a third corner 30C is bent. FIG. 14 is a schematic plan view showing a state that the fourth guide 111*d* is moved. FIG. 15 is a schematic plan view showing a state that the rectangular conductor D is moved by the short-side feeding. FIG. 16 is a schematic plan view showing a state that the second guide 111*b* is moved. FIG. 17 is a schematic plan view showing a state that a fourth corner 30D is formed by bending. FIG. 18 is a schematic plan view showing a state that the rectangular conductor D is moved by long-side feeding.

Four guide bars 111 are provided on the base plate 113 of the guide device 110 are referred to as the first guide 111*a,* second guide 111*b*, third guide 111*c*, and fourth guide 111*d* for convenience of explanation. The support plate 112 is provided at some place of the guide bars 111 and indicated by a chain double-dashed line in FIGS. 6 to 18. In FIG. 6, the coil 30 formed of the rectangular conductor D already wound by edgewise bending is provided at a leading end of the rectangular conductor D. This coil 30 is placed with the outer side surface contacting with the outer peripheral surface of the first guide 111*a*.

The bending jig 152 is rotated about the rotation center Cp1 from the state shown in FIG. 6, the bending jig 152 is pressed against the side surface of the rectangular conductor D to edgewise bend it to form the first corner 30A as shown in FIG. 7. The rotation center Cp1 coincides with the center of the center post 151. At that time, the rectangular conductor D is clamped and held in the thickness direction by the center post 151. The base plate 113 is also rotated to move the first guide 111 a remaining in contact with the outer side surface of the coil 30, thereby continuing to support the outer side surface of the coil 30 by the first guide 111*a*. The rotation center Cp2 of the base plate 113 is set at a deviated position from the rotation center Cp1.

As shown in FIG. 8, successively, the base plate 113 is rotated to move the position of the third guide 111*c*. Accordingly, the third guide 111*c* is moved to a position into contact with the side surface of the coil 30. Then, the short-side feeding of the coil 30 is performed as shown in FIG. 9. While the rectangular conductor D is clamped by the clamp 121 of the feeding mechanism 120, the rectangular conductor D is fed by a distance required to form the short side 32. At that time, the support plate 112 is rotated counterclockwise to move the position of the third guide 111*c* to follow the movement of the coil 30. The base plate 113 is then rotated and moved to bring the first guide 111*a* into contact with the outer side surface of the coil 30 as shown in FIG. 10.

The bending jig 152 is rotated as shown in FIG. 11 to press against the side surface of the rectangular conductor D to edgewise bend the rectangular conductor D, thus forming the second corner 30B. At that time, the rectangular conductor D is clamped and held in the thickness direction by the center post 151. The base plate 113 is also rotated to move the first guide 111a remaining in contact with the outer side surface of the coil 30, thereby continuing to support the outer side surface of the coil 30 by the first guide 111a during edgewise bending. As shown in FIG. 12, the long-side feeding of the coil 30 is performed. The feeding mechanism 120 feeds the rectangular conductor D by a distance required to form the long side 31. At the time when feeding of the rectangular conductor D is finished, the second guide 111b is in contact with the side surface of the coil 30.

Subsequently, the bending jig 152 is rotated as shown in FIG. 13, pressing against the side surface of the rectangular conductor D to edgewise bend it to form the third corner 30C. At that time, the rectangular conductor D is clamped and held in the thickness direction by the center post 151. The base plate 113 is also rotated to move the second guide 111b remaining in contact with the outer side surface of the coil 30, thereby continuing to support the outer side surface of the coil 30 by the second guide 111b during edgewise bending. The base plate 113 is rotated as shown in FIG. 14 to move the position of the fourth guide 111d. Thus, the fourth guide 111d is moved to the position to support the outer side surface of the coil 30.

Successively, the short-side feeding of the coil 30 is performed as shown in FIG. 15. While the rectangular conductor D is clamped by the feeding clamp 121 of the feeding mechanism 120, the rectangular conductor D is fed by a distance required to form the short side 32. At that time, the support plate 112 is rotated counterclockwise to move the position of the fourth guide 111d to follow the movement of the coil 30. In FIG. 16, the support plate 112 is rotated to move the second guide 111b to a position into contact with the outer side surface of the coil 30.

The bending jig 152 is rotated as shown in FIG. 17 to press against the side surface of the rectangular conductor D to edgewise bend it, thus forming the fourth corner 30D. At that time, the rectangular conductor D is clamped and held by the center post 151. The base plate 113 is also rotated to move the second guide 111b remaining in contact with the outer side surface of the coil 30, thereby continuing to support the outer side surface of the coil 30 by the second guide 111b during edgewise bending. As shown in FIG. 18, the long-side feeding of the coil 30 is performed. The feeding mechanism 120 feeds the rectangular conductor D by a distance required to form the long side 31. Since this state is the same as shown in FIG. 6, the steps from FIG. 7 are subsequently repeated to wind and form the coil 30. In FIGS. 6 to 18, the step of winding the second column 30b is explained. Even in a case of winding the first column 30a to be placed on the inner circumferential side of the second column 30b, the same steps are performed.

Figure 19:
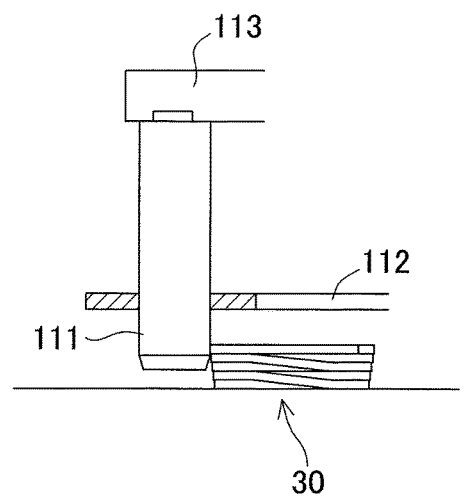
FIG. 19 is a side view of a coil during winding (up to a fifth layer) in the first embodiment.
Figure 20:
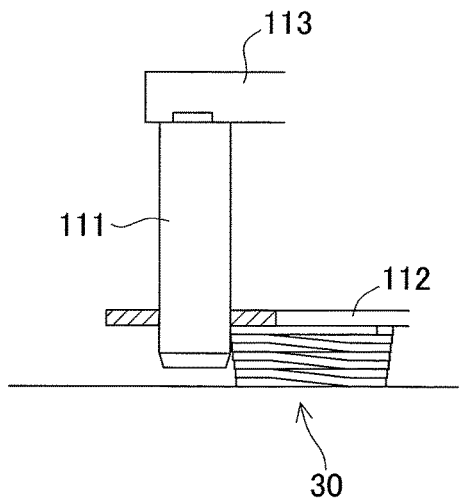
FIG. 20 is a side view of the coil during winding (up to a seventh layer) in the first embodiment.
Figure 21:
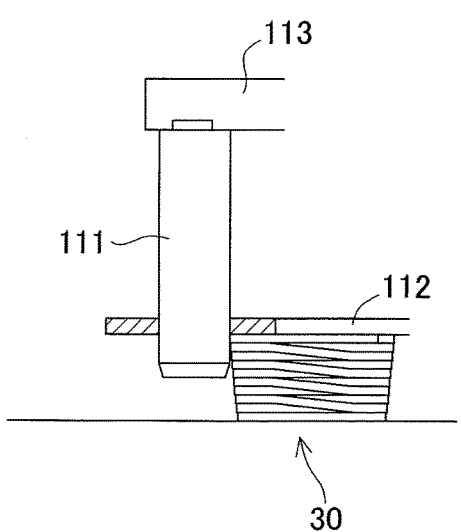
FIG. 21 is a side view of the coil during winding (up to a tenth layer) in the first embodiment.

When the outer side surface of the coil 30 is to be supported by the guide bar 111, this supporting is preferably performed in a situation that winding of the coil 30 is advanced. The support plate 112 attached to the guide bar 111 can support the coil 30. FIGS. 19 to 21 are side views of the coil 30 during a winding operation. In FIG. 19, the coil 30 is wound up to a fifth layer 305. In FIG. 20, the coil 30 is wound up to a seventh layer 307. In FIG. 21, the coil 30 is wound up to a tenth layer. During winding of the coil 30, the coil 30 is not supported by the guide bar 111 from the first layer 301 to the third layer 303. The guide bar 111 is placed so as to come into contact with the outer side surface of the coil 30 from the vicinity of the fourth layer 304 and the fifth layer 305, as shown in FIG. 19, thereby preventing inclination of the coil 30. At that time, the coil 30 is not supported by the support plate 112.

Winding of the coil 30 is further advance and, from the vicinity of the seventh layer 307 or eighth layer 308, the guide bar 111 is placed so at to come into contact with the outer side surface of the coil 30 as shown in FIG. 20, and also the guide bar 111 is placed in contact with the upper end face of the coil 30 or the support plate 112 is held with a slight clearance in order to suppress inclination of the coil 30. When the winding of the coil 30 is further advanced as shown in FIG. 21, the base plate 113 is moved up so that the position of the support plate 112 is moved as the coil 30 is wound and laminated. This can be realized because the elevating motor 114 is provided to move up the bracket 118 holding the base plate 113 as shown in FIG. 5. Even when the guide bars 111 are to be retracted when the coil 30 is to be taken out, the guide bars 111 and the support plate 112 are moved up by the elevating motor 114, thereby allowing the coil 30 to be easily taken out.

Figure 22:
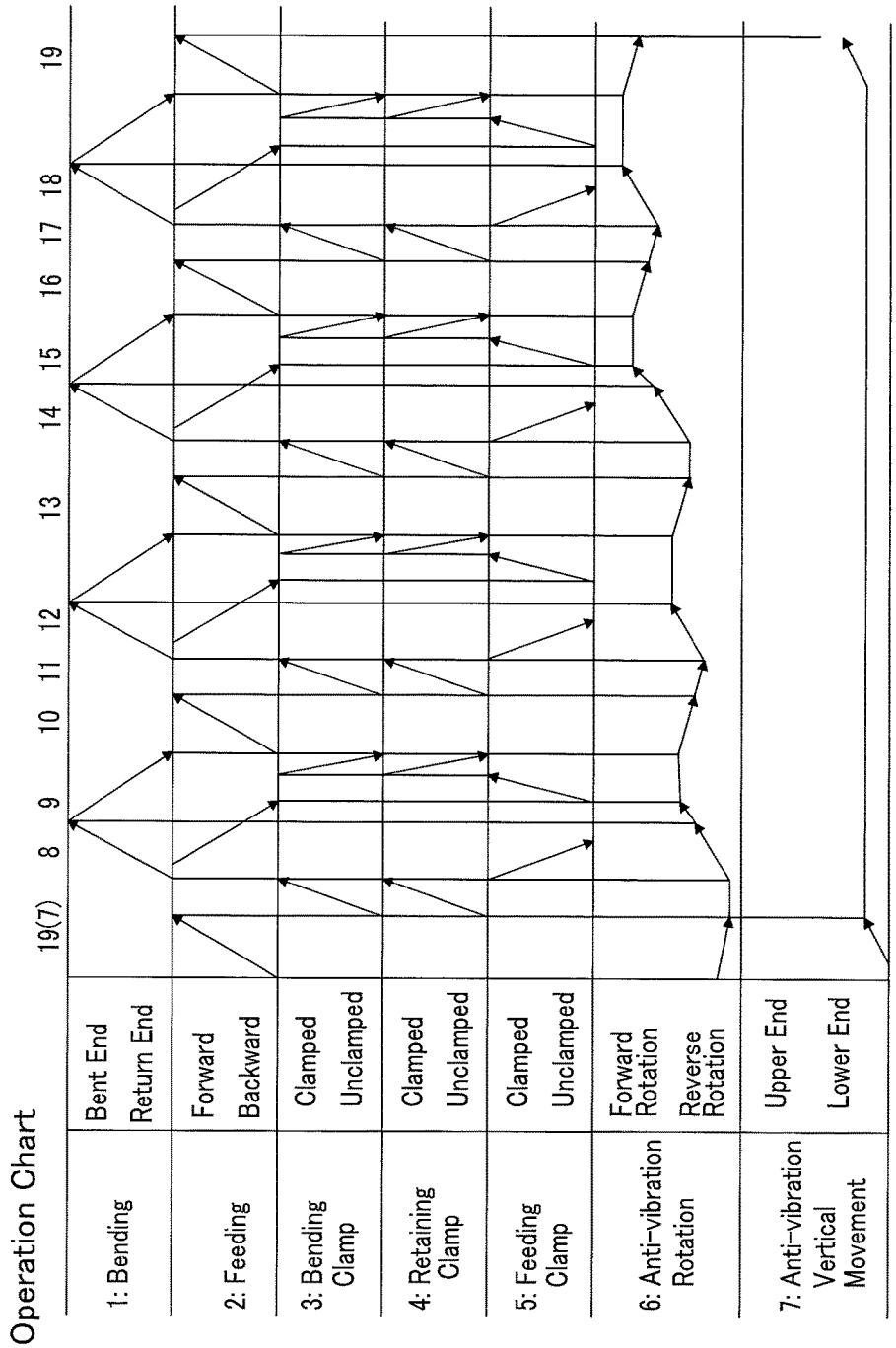
FIG. 22 is an operation chart of a winding device and a guide device in the first embodiment.

FIG. 22 is an operation chart of the winding device 100 and the guide device 110, in which a graph "Bending" on the first row indicates motion of the bending jig 152 during edgewise bending of the rectangular conductor D, where "Bent End" represents a state of the conductor D bent at 90 degrees shown in FIG. 7, "Return End" is an initial position, that is, a state of the same in the position shown in FIG. 6. A graph "Feeding" on the second row indicates a feeding operation of the feeding mechanism 120, where "Forward" represents a state where the feeding mechanism 120 is fed by a predetermined distance and "Backward" represents returning to the initial position. A graph "Bending Clamp" on the third row indicates a clamped state of the rectangular conductor D by the center post 151, where "Clamped" represents a state of the rectangular conductor by the center post 151 in the thickness direction and "Unclamped" represents a state of the rectangular conductor D enabled to be fed.

A graph "Retaining Clamp" on the fourth row indicates the operation of the holding clamp 131, where "Clamped" represents a state of the rectangular conductor D clamped in the thickness direction by the holding clamp 131 and "Unclamped" represents a state of the rectangular conductor D enabled to be fed. A graph "Feeding Clamp" on the fifth row indicates a clamping state of the feeding clamp 121, where "Clamped" represents a state of the rectangular conductor D clamped in the thickness direction by the feeding clamp 121 and enabled to be fed by the feeding mechanism 120 and "Unclamped" represents a state of the rectangular conductor D not clamped by the feeding clamp 121. In combination with "Feeding", the feeding clamp 121 is re-grasped and repeats feeding of the rectangular conductor D.

A graph "Anti-vibration Rotation" on the sixth row indicates a rotation state of the guide bars 111, where "Forward Rotation" represents clockwise rotation of the base plate 113 and "Reverse Rotation" represents counterclockwise rotation of the base plate 113. A graph "Anti-vibration Vertical Movement" indicates upward movement of the base plate 113 by the elevating motor 114, where "Upper End" and "Lower End" represent an upper and a lower end of the elevating motor 114. The uppermost row is assigned the figure numbers. The operation chart in FIG. 22 shows a state of winding half of one layer, i.e., from the first corner 30A to the fourth corner 30D, corresponding to FIGS. 6 to 18. This operation is repeated to form the coil 30.

The winding device 100 in the first embodiment configured as above can provide the following operations and effects.

Firstly, one effect is to reduce the cost of the winding device. The winding method in the first embodiment is configured to rotate the guide bars 111 having the motor 115 in accordance with the bending operation of the rectangular conductor D by the bending jig 152, thereby causing one guide bar 111 to support the outer side surface of the coil 30, i.e., on a side in a rotation direction of the bending jig 152.

The coil 30 is supported in such a manner that the base plate 113 of the guide device 110 is rotated by the motor 115. Since a conventional art adopts, for example, a method for supporting the inner wall of the coil 30 by a jig having a taper, complicated motions may be required according to winding of the coil 30. This is described in detail in Patent Document 1; however, since the coil 30 is wound in an almost rectangular shape having the long sides 31 and the short sides 32, it is moved so as to depict an involute curve. Accordingly, the guide of the coil 30 needs the same operations. However, to realize the motions following the involute curve, it is conceivable to need a servo motor for controlling the two vertical axes and the one rotation axis and further to tandem drive in order to enhance the winding speed of the coil 30.

For the coil 30, it takes 1 second or less to obtain the first corner 30A to the fourth corner 30D by edgewise bending. Accordingly, the winding device 100 also needs to be operated at high speeds. However, when the guide with large mass is operated at high speeds, the influence such as inertia makes precise control difficult. It is therefore necessary to prepare two servo motors per one axis to tandem drive for precise control.

In contrast, when the winding device 100 shown in the first embodiment is used, if only the guide device 110 is provided with the motor 115 alone, that is, with the rotation one axis alone, the coil 30 can be guided. This is because the guide bar 111 supports the coil 30 by moving in contact with the outer side surface of the coil 30. For instance, comparing between FIGS. 10 and 11, it is found that the first guide 111a contacting with the coil 30 is in contact with the end side of the coil 30 in FIG. 10, whereas it is in contact with the center side of the coil 30 in FIG. 11. This is a method of supporting one point of the outer side surface of the coil 30, so that the coil 30 can be supported by the guide bar 111 even when the positions of the coil 30 and the guide bar 111 are relatively changed.

Therefore, if only the motor 115 is provided to rotate the base plate 113, the coil 30 can be guided to follow the coil 30. Since the number of axes required for driving can be reduced in this way, a drive mechanism to be used can be simplified. Since the bending jig 152 provided in the winding device 100 is also sufficiently driven only by the rotary shaft, a manufacturing cost of the winding device 100 can be reduced.

The guide bars 111 used in the guide device 110 include the first guide 111a and the second guide 111b located diagonally opposite to each other with respect to the rotation center Cp2 of the guide bars 111. Assuming that the corners of the coil 30 are referred to as the first corner 30A, the second corner 30B, the third corner 30C, and the fourth corner 30D in the order to be edgewise bent, the first guide 111a supports the outer side surface of the coil 30 when the first corner 30A is edgewise bent and when the second corner 30B is edgewise bent by the bending jig 152, and the second guide 111b supports the outer side surface of the coil 30 when the third corner 30C is edgewise bent and when the fourth corner 30D is edgewise bent by the bending jig 152.

Accordingly, in the light of supporting the conductor D only during edgewise bending, as long as only the first guide 111a and the second guide 111b are provided. With these two guides, it is unnecessary to take a troublesome work to move the guide bars 111 by 180 degrees after the second corner 30B is formed. This can reduce lead time required for winding of the coil 30 using the winding device 100. If the guide bars 111 support the coil 30 only during edgewise bending, it is conceivable to rotate the guide bars 111 during feeding of the rectangular conductor D to return the guide bars 111 to the respective initial positions. However, when the guide bars 111 are to be moved by avoiding interference with the coil 30, a mechanism for moving up the guide bars 111 is also required for 180-degree movement.

If the guide bar 111 is moved upward to return to the initial position, this returning may be too late for the time until feeding of the rectangular conductor D is completed and the lead time may be prolonged. In the first embodiment, the two guide bars 111 that supports the outer side surface of the coil 30 during edgewise bending of the rectangular conductor D, i.e., the first guide 111a and the second guide 111b, are provided in opposing corners. This enables guiding the coil 30 by alternate use of the first guide 111a and the second guide 111b without loss time.

The guide bars 111 have the rotation center Cp2 at a position deviated from the rotation center Cp1 of the bending jig 152 and include the third guide 111c and the fourth guide 111d diagonally opposite to each other with respect to the rotation center Cp2 of the guide bars 111. The coil 30 is wound in a rectangular form. The bending jig 152 performs the long-side feeding to form a long side portion of the rectangular shape by a predetermined distance feeding operation and the short-side feeding to form a short side portion of the rectangular shape by a predetermined distance feeding. The third guide 111c or the fourth guide 111d is placed in contact with the outer side surface of the coil 30 before the rectangular conductor D is moved by the short-side feeding by the center post 151. The third guide 111c or the fourth guide 111d is rotated in accordance with the operation of the short-side feeding of the rectangular conductor D by the center post 151 to support the outer side surface of the coil 30 located on a side in an advancing direction of the center post 151.

In performing the short-side feeding of the rectangular conductor D by the feeding mechanism 120, the outer side surface of the coil 30 is supported by the third guide 111c or the fourth guide 111d as shown in FIGS. 9 and 15. This enables preventing the coil 30 from collapsing due to the action of inertia generated in feeding the rectangular conductor D. The third guide 111c and the fourth guide 111d are placed in a moving direction of the coil 30 and are moved by supporting the coil 30 during the short-side feeding of the rectangular conductor D, thereby preventing deformation of the coil 30. This supporting using the guide bars 111 is not performed during the long-side feeding, but the coil 30 is less likely to collapse during the long-side feeding and thus is not deformed even without support.

Since the outer side surface of the coil 30 is supported by the guide bar 111, it is possible to prevent the coil 30 from becoming deformed. Thus, any troublesome action such as pressing the coil 30 is not necessary in inserting the coil 30 on the stator core 20, resulting in cost reduction of the coil 30. When the coil 30 is deformed due to collapse of the coil 30 during winding of the rectangular conductor D, it is difficult to uncurl or straighten the wound coil 30. This is because when a plastically deformed member is to be corrected, a force in an opposite direction is exerted thereto to plastically deform the member and in such a situation that a gap occurs between the rectangular conductors D due to deformation of the coil 30, it is difficult to plastic deform the coil 30 in the opposite direction.

Even though an opened or loosen coil 30 has to be inserted directly on a teeth part 21 of a stator core 20, there is no sufficient margin of the length of the teeth part 21 for the purpose of enhancing the lamination factor of a stator 10. This needs to adopt a method of assembling the coil 30 by pressing against the stator core 20 by use of an appropriate jig as needed and coating over the coil 30 in this state by resin or the like into a predetermined shape. This is troublesome and expensive. However, as long as deformation of the coil 30 is prevented at a stage of winding of the rectangular conductor D, such troublesomeness and high cost are not necessary. This can contribute to reduction in manufacturing cost of the stator 10.

Such deformation during winding of the coil 30 tends to become noticeable as the number of turns is larger. A double-winding coil as with the coil 30 in the first embodiment has a larger number of turns and thus is largely influenced by deformation. Of course, the same applies to the case where the number of winding turns of the coil 30 is increased. Thus, the guide device 110 shown in the first embodiment is provided in the winding device 100 to form the coil 30, this can contribute to reducing of facility cost and shortening of the manufacturing lead time of the coil 30.

The reason why the rotation center Cp2 of the guide bars 111 is slightly deviated from the rotation center Cp1 of the bending jig 152 as shown in FIG. 6 is to avoid interference between the guide bars 111 and the coil 30. When the guides, such as the third guide 111c and the fourth guide 111d, for supporting the coil 30 during short-side feeding of the rectangular conductor D are provided on the base plate 113, the guide bars 111 will interfere with the coil 30 due to the size of each guide bar 111 and interfere with the rectangular conductor D due to the width of each guide bar 111. Accordingly, the rotation center Cp1 and the rotation center Cp2 are set to be deviated in view of design consideration. This deviation is set to place the rotation center Cp2 to the left of the rotation center Cp1 in FIG. 6. Thus, the deviation in a right-left direction in the figure can eliminate the interference between the guide bars 111 and the coil 30. When the rectangular conductor D fed by the feeding mechanism 120 without being guided by the guide bars 111, such a deviation does not need to be provided.

The guide bars 111 are provided with the support plate 112 to support the coil 30. The support plate 112 is placed to face the plane of the coil 30 perpendicular to the winding center of the coil 30. The guide bar 111 is configured to support the coil 30 in an advancing direction. However, in the light of considering the action of inertia, it is preferable to support the coil 30 not only on a side in the advancing direction but also on an opposite side. This can be assisted by the support plate 112 provided in the guide bars 111. Specifically, supporting the upper surface of the coil 30 can address collapse of the coil 30 in all directions. However, if the support plate 112 touches the upper plate of the coil 30, undesirable friction occurs between the upper surface of the coil 30 and the support plate 112. It is therefore preferable to place the support plate 112 at such a distance as to support of the coil 30 against collapse.

As another effect, the tool changing is unnecessary. A pattern that holds the inner circumferential side of the coil 30 as shown in Patent Document 1 needs a holding member conforming with the shape of the coil 30. This needs the tool changing when a coil 30 of another shape is to be produced. However, replacement of the holding member requires labors and times. On the other hand, the guide device 110 in the first embodiment is configured to support the outer side surface of the coil 30 by use of the guide bars 111. Thus, if only the stop position of the guide bars 111, the timing of rotating the motor 115, and others are simply changed, a plurality of types of coils 30 can be addressed. This enables contributing to cost reduction of the stator 10.

A second embodiment of the invention will be explained below. The second embodiment is substantially identical in structure to the first embodiment excepting a slight difference in shape of the guide bar 111. The following explanation is made with the differences.

Figure 23:
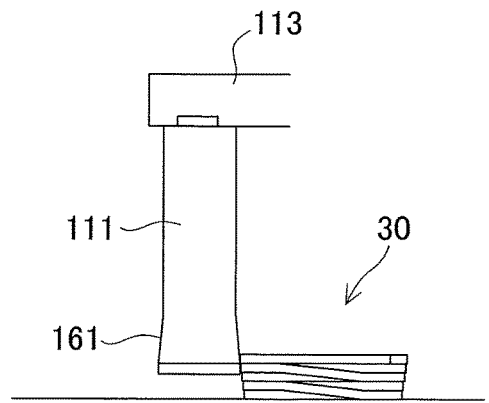
FIG. 23 is a side view of a coil during winding (up to a fifth layer) in a second embodiment.
Figure 24:
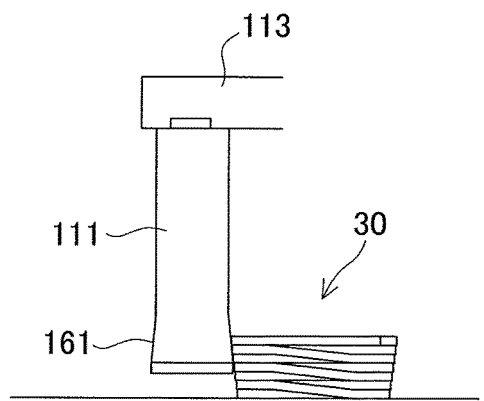
FIG. 24 is a side view of the coil during winding (up to a seventh layer) in the second embodiment.
Figure 25:
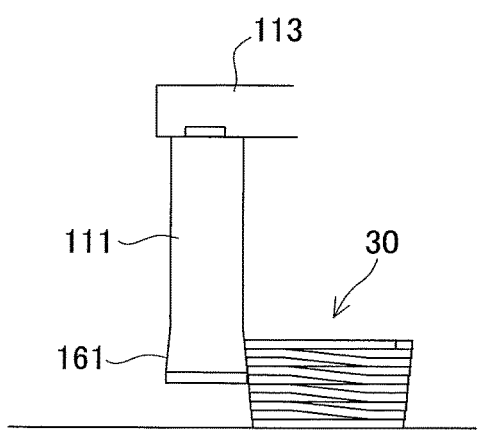
FIG. 25 is a side view of the coil during winding (up to a tenth layer) in the second embodiment.

FIGS. 23 to 25 show side views of the coil 30 during winding in the second embodiment. In FIG. 23, the coil 30 is wound up to a fifth layer 305. In FIG. 24, the coil 30 is wound up to a seventh layer 307. In FIG. 25, the coil 30 is wound up to a tenth layer. Each guide bar 111 in the second embodiment does not have a simple cylindrical shape and is provided with a tapered portion 161 at a distal end. This tapered portion 161 is designed with an angle determined according to the shape of the outer side surface of the coil 30. Accordingly, the tapered portion 161 can support each layer of the coil 30.

The guide bars 111 are controlled to gradually move up by the elevating motor 114 as the coil 30 is progressively wound as shown in FIGS. 24 and 25. Even though the winding of the rectangular conductor D is advanced, it is possible to appropriately hold the outer side surface of the coil 30. Although FIGS. 23 to 25 omit the support plate 112 to simplify the explanation, the support plate 112 may be provided to support the upper surface of the coil 30. This configuration can provide the effects equivalent to those in the first embodiment.

The present invention is explained along the above embodiments, but is not limited thereto. The invention may be embodied in other specific forms without departing from the essential characteristics thereof. For instance, the stator 10 in the above embodiments is configured to have ten layers. This is a mere design matter and the stator 10 may be configured in different design. The number of winding turns, the number of layers of the coil 30, and others are also design matters and thus the invention is also applicable to variations thereof.

FIGS. 19 to 21 and FIGS. 23 to 26 show the height of each guide bar 111 to support the outer side surface of the coil 30. This supporting height may be changed according to the thickness of the rectangular conductor D and others. The position of the support plate 112 may also be changed. Furthermore, the device configurations of the winding device 100 and the guide device 110 are mere examples, which may be changed within the scope of the invention. Regarding the number of guide bars 111, the coil 30 can be supported during edgewise bending by the bending jig 152 as long as at least the first guide 111a and the second guide 111b are provided and thus a configuration that reduces the number of guide bars 111 or other configurations may be adopted if it is unnecessary to support the coil 30 during feeding of the rectangular conductor D by the feeding mechanism 120.

REFERENCE SIGNS LIST

10 Stator
20 Stator core

30 Coil
40 Insulator
100 Winding device
110 Guide device
111 Guide bar
112 Support plate
113 Base plate
114 Elevating motor
115 Motor
120 Feeding mechanism
130 Holding mechanism
140 Wind-off mechanism
150 Wind-up mechanism

The invention claimed is:

1. A method for edgewise winding a coil, including a bending operation using a bending unit to edgewise bend a rectangular conductor and a predetermined distance feeding operation using a feeding unit to feed the rectangular conductor by a predetermined distance, the bending operation and the predetermined distance feeding operation being repeated to form the coil,
   the bending unit rotates a guide provided on a base plate about a rotation center, having a rotation mechanism in accordance with the bending operation of the rectangular conductor by the bending unit,
   the guide supports an outer side surface of the coil on a side in a rotation direction of the bending unit,
   the guide includes a first guide and a second guide located diagonally opposite to each other with respect to the rotation center of the base plate, wherein the first guide and the second guide maintaining a constant relative positional relationship to each other,
   the guide being configured to rotate in a rotational direction of the bending unit while maintaining the first guide and the second guide in a constant relative positional relationship to each other,
   the coil has corners referred to as a first corner, a second corner, a third corner, and a fourth corner in an order to be formed by edgewise bending,
   the first guide supports the outer side surface of the coil when the bending unit forms the first corner by edgewise bending and when the bending unit forms the second corner by edgewise bending, and
   the second guide supports the outer side surface of the coil when the bending unit forms the third corner by edgewise bending and when the bending unit forms the fourth corner by edgewise bending.

2. The method for winding an edgewise coil according to claim 1, wherein
   the guide has the rotation center at a position deviated from a rotation center of the bending unit and includes a third guide and a fourth guide diagonally opposite to each other with respect to the rotation center of the guide,
   the coil is wound in a rectangular shape,
   the feeding unit performs a long-side feeding operation to form a long side portion of the rectangular shape and a short-side feeding operation to form a short side portion of the rectangular shape,
   the third guide or the fourth guide is placed in contact with the outer side surface of the coil before the rectangular conductor is moved by the short-side feeding operation by the feeding unit, and
   the third guide or the fourth guide is rotated in accordance with an operation of short-side feeding the rectangular conductor by the feeding unit to support the outer side surface of the coil on a side in an advancing direction of the feed unit.

3. The method for winding an edgewise coil according to claim 1, wherein the guide is provided with a support plate configured to support the coil, the support plate being placed to face a plane of the coil perpendicular to a winding center of the coil.

4. The method for winding an edgewise coil according to claim 1, wherein the guide is provided with a support plate configured to support the coil, the support plate being placed to face a plane of the coil perpendicular to a winding center of the coil.

5. The method for winding an edgewise coil according to claim 2, wherein the guide is provided with a support plate configured to support the coil, the support plate being placed to face a plane of the coil perpendicular to a winding center of the coil.

* * * * *